US010906218B2

(12) United States Patent
Langstaff et al.

(10) Patent No.: US 10,906,218 B2
(45) Date of Patent: Feb. 2, 2021

(54) IN-MOULD LABELLING PROCESS

(71) Applicants: Innovia Films Limited, Wigton (GB); Alpla-Werke Alwin Lehner GmbH & Co KG, Hard (AT)

(72) Inventors: Stephen Langstaff, Wigton (GB); Christopher Konkel, Wigton (GB); Robert Siegl, Dornbirn (AT)

(73) Assignees: INNOVIA FILMS LIMITED, Cumbria (GB); ALPLA-WERKE ALWIN LEHNER GMBH & CO KG, Hard (AT)

( * ) Notice: Subject to any disclaimer, the term of this patent is extended or adjusted under 35 U.S.C. 154(b) by 308 days.

(21) Appl. No.: 15/845,588

(22) Filed: Dec. 18, 2017

(65) Prior Publication Data

US 2018/0207845 A1 Jul. 26, 2018

Related U.S. Application Data

(63) Continuation of application No. 14/364,263, filed as application No. PCT/GB2013/050172 on Jan. 25, 2013.

(30) Foreign Application Priority Data

Jan. 27, 2012 (GB) .................... 1201431.2

(51) Int. Cl.
*B29C 49/24* (2006.01)
*B29C 51/16* (2006.01)
(Continued)

(52) U.S. Cl.
CPC ........ *B29C 45/14065* (2013.01); *B02C 23/08* (2013.01); *B02C 23/18* (2013.01);
(Continued)

(58) Field of Classification Search
CPC ........ B29C 49/2408; B29C 2049/2412; B29C 2049/2452; B29C 2049/2429;
(Continued)

(56) References Cited

U.S. PATENT DOCUMENTS 3,227,787 A 1/1966 Battenfield
3,674,391 A * 7/1972 Welle .................. B29C 49/2408
425/503

(Continued)

FOREIGN PATENT DOCUMENTS

CH 444463 A * 9/1967 ......... B29C 49/2408
CN 201334143 10/2009
(Continued)

OTHER PUBLICATIONS

File history of U.S. Appl. No. 14/364,263, filed Jun. 10, 2014.

*Primary Examiner* — Robert B Davis
(74) *Attorney, Agent, or Firm* — Ping Wang; Morris, Manning & Martin, LLP

(57) ABSTRACT

There is disclosed an in-mould labelling process for the manufacture of a labelled article comprising the steps of: feeding a labelstock web into a mould; forming an article in the mould such that the formed article contacts and effectively adheres to a label of the labelstock web; detaching the adhered label from the labelstock web; and removing the formed and labelled article from the mould.

7 Claims, 14 Drawing Sheets

(51) Int. Cl.

| | |
|---|---|
| *B29C 45/14* | (2006.01) |
| *B29C 45/16* | (2006.01) |
| *B02C 23/08* | (2006.01) |
| *B02C 23/18* | (2006.01) |
| *B08B 9/08* | (2006.01) |
| *B29B 17/02* | (2006.01) |
| *B29C 37/00* | (2006.01) |
| *B29C 43/18* | (2006.01) |
| *B29C 43/36* | (2006.01) |
| *B29C 45/26* | (2006.01) |
| *B29C 49/48* | (2006.01) |
| *B29C 45/27* | (2006.01) |
| *B29K 105/16* | (2006.01) |
| *B29K 23/00* | (2006.01) |
| *B29K 67/00* | (2006.01) |
| *B29K 105/00* | (2006.01) |
| *B29L 9/00* | (2006.01) |
| *B29L 31/00* | (2006.01) |

(52) U.S. Cl.
CPC .............. *B08B 9/083* (2013.01); *B29B 17/02* (2013.01); *B29C 37/00* (2013.01); *B29C 43/18* (2013.01); *B29C 43/36* (2013.01); *B29C 45/14811* (2013.01); *B29C 45/14827* (2013.01); *B29C 45/1603* (2013.01); *B29C 45/26* (2013.01); *B29C 49/2408* (2013.01); *B29C 49/48* (2013.01); *B29C 51/167* (2013.01); *B29B 2017/0244* (2013.01); *B29C 45/1645* (2013.01); *B29C 45/2703* (2013.01); *B29C 2043/189* (2013.01); *B29C 2043/3602* (2013.01); *B29C 2045/14139* (2013.01); *B29C 2045/14868* (2013.01); *B29C 2049/241* (2013.01); *B29C 2049/2412* (2013.01); *B29C 2049/2414* (2013.01); *B29C 2049/2452* (2013.01); *B29C 2049/2483* (2013.01); *B29K 2023/06* (2013.01); *B29K 2023/12* (2013.01); *B29K 2023/18* (2013.01); *B29K 2067/003* (2013.01); *B29K 2105/0085* (2013.01); *B29K 2105/0097* (2013.01); *B29K 2105/16* (2013.01); *B29K 2715/006* (2013.01); *B29K 2995/0064* (2013.01); *B29L 2009/00* (2013.01); *B29L 2031/7158* (2013.01); *Y02P 70/10* (2015.11); *Y10T 156/1111* (2015.01); *Y10T 428/31797* (2015.04)

(58) Field of Classification Search
CPC .... B29C 2049/2483; B29C 2049/2477; B29C 51/167; B29C 45/14827; B29C 45/14065; B29C 43/18
See application file for complete search history.

(56) References Cited

U.S. PATENT DOCUMENTS

| | | | | |
|---|---|---|---|---|
| 3,684,418 | A | * | 8/1972 | Langecker .......... B29C 49/2408 425/122 |
| 4,501,548 | A | | 2/1985 | Jahnel |
| 4,824,630 | A | | 4/1989 | Mohney |
| 5,110,055 | A | | 5/1992 | Teeny |
| 6,114,401 | A | | 9/2000 | Doonan |
| 6,165,576 | A | | 12/2000 | Freedman et al. |
| 7,807,243 | B2 | | 10/2010 | Iwasa et al. |
| 2003/0099793 | A1 | | 5/2003 | Dronzek, Jr. |
| 2004/0056389 | A1 | | 3/2004 | Schwinn |
| 2007/0184148 | A1 | | 8/2007 | Toyooka et al. |
| 2008/0143017 | A1 | | 6/2008 | Hoogland |

FOREIGN PATENT DOCUMENTS

| | | | | |
|---|---|---|---|---|
| DE | 1479083-b29cA1 | * | 2/1969 | ......... B29C 49/2408 |
| DE | 1805 328 | | 5/1970 | |
| DE | 100 02 682 | | 8/2001 | |
| DE | 1 0 2007 059 890 | | 6/2009 | |
| EP | 0 324 857 | | 7/1986 | |
| EP | 0 822 048 | | 2/1998 | |
| EP | 1 553 126 | | 7/2005 | |
| EP | 1 614 516 | | 1/2006 | |
| GB | 1031518 | | 6/1966 | |
| JP | 62-164505 | | 7/1987 | |
| JP | 63-232718 | | 10/1988 | |
| JP | 02-041224 | | 2/1990 | |
| JP | 03-026524 | | 2/1991 | |
| JP | 04-175141 | | 6/1992 | |
| JP | 07-092913 | | 4/1995 | |
| JP | 11-114993 | | 4/1999 | |
| JP | 2010-143136 | | 7/2010 | |
| WO | 93/04842 | | 3/1993 | |
| WO | 2005/120963 | | 12/2005 | |
| WO | 2006/054725 | | 5/2006 | |

* cited by examiner

IN-MOULD LABELLING PROCESS

This application is a Continuation of U.S. application Ser. No. 14/364,263, filed Jun. 10, 2014, which claims priority to International Patent Application No. PCT/GB2013/050172, filed Jan. 25, 2013, which claims priority to United Kingdom patent Application No. 1201431.2, filed Jan. 27, 2012. The entirety of the aforementioned applications is incorporated herein by reference.

FIELD

The present invention relates to a process and a mould for manufacturing an in-mould labelled article.

BACKGROUND

The technique of in-mould labelling (IML) has been known for many years. It involves the use of paper or plastic labels which ultimately form an integral part of the moulded product. The in-mould labels must, therefore, be able to tolerate the heat applied during the moulding process. The resultant product is a pre-decorated item, such as a container or the like, which may be filled thereafter. In contrast to glue applied or pressure-sensitive labels which appear above the surface of the container, in-mould labels appear as part of the container. In-mould labels are greatly advantageous over traditional labels to be applied to an article after manufacturing thereof in that, the label is intimately bonded to the article and, therefore, highly resistant to ripping, scratching, peeling and other forms of label damage. Furthermore, in-mould labelling effectively eliminates the need for a separate labelling process following the manufacture of the container, which reduces labour and equipment costs.

In-mould labels can be used to cover a portion of a container or to cover the entire outer surface of a container. In the latter case, the in-mould label serves as an additional layer and may, therefore, enhance the structural integrity of the container, or add to the barrier performance of the container. Even in the former case, the labelled container may be strengthened in the region of the applied label as a result of the structural contribution made by the label.

In-mould labels generally comprise a carrier base, consisting of a polymeric or biopolymeric carrier film, on which a decorative pattern or a written message is printed. The adhesion of such labels to a polymeric article can be enhanced by applying a heat sealable layer (e.g. a film or a coating) onto the backing side (i.e., not printed surface) of the in-mould label which is to be in contact with the polymeric article. The in-mould label may be cut to the desired shape and size from a larger sheet of the label material, using label cutting apparatus.

In conventional in-mould labelling processes, a cut-out label is positioned against a wall of a mould for injection moulding or for blow moulding or the like and held in place by means such as electrostatic force, vacuum suction or a handling unit, and a polymeric article is moulded by injecting a mass of polymeric melt or by blowing a polymeric parison against the mould walls on which the in-mould label is held.

Problems associated with conventional in-mould labelling processes include high operating costs, low output and the requirement of complex mechanical equipment for steps such as positioning the label within the mould.

JP 2010-143136 discloses an apparatus for obtaining an in-mould labelled article using injection moulding. The apparatus comprises a label cutter which punches out a label from a label tape and then advances and holds the label at the surface of a cavity of a mould, the cavity is filled with resin and the in-mould labelled article is formed.

JP 63-252718 discloses a method for decorating a hollow moulded object with a pattern, wherein a transferring foil with a printing layer is inserted into a mould, and said printing layer is transferred onto a hollow moulded object in the process of moulding the hollow moulded object.

JP 4-175141 discloses a process for making a blow moulded product which includes the steps of positioning a sheet having a surface pattern which is incompatible with a parison in a mould for blow molding; extruding a softened parison of a synthetic resin from a die head; holding the parison in the mould and blowing gas into the parison to be expanded to form a blow moulded product with a surface feature of the sheet reproduced on the blow moulded product; and separating the sheet and the blow moulded product from each other.

GB 1,031,518 discloses a method of blow moulding an article from a hot tubular blank extruded into a mould, a printed sheet is inserted between the mould wall and the blank and is bonded with the wall of the hollowed article formed. A similar process is disclosed in U.S. Pat. No. 3,227,787.

EP 0 324 857 discloses a moulding machine consisting of an injection moulding unit for moulding a preform; a rotary moulding machine which is adapted to receive the preform directly or after the temperature thereof has been regulated, and which has a draw-blow moulding unit provided with a blow mould for moulding the preform into a hollow container and a moulded product recovering unit; and a label insert unit. The unit is composed of a label supply means positioned on one side of the blow mould, a driving means for moving the label supply means towards and away from the blow mould, and a label magazine disposed at the front side of the label supply means.

EP 0 822 048 discloses a foil-decorating injection moulding method which adjusts the tension of a decorative sheet so that the decorative sheet may not break, slip off a damper, crease or be dislocated when the damper clamps the decorative sheet.

DE 1805328 discloses a method of forming decorations on compression-moulded articles which comprises introducing a decoration into a mould and forming an object by contacting it with the decorative pattern, wherein the decoration is introduced into the mould wall by a reciprocating piston.

U.S. Pat. No. 4,501,548 discloses a label transferring device for blow moulding machines which includes a sliding mould insert with a plurality of label carrying segments which are shifted into an access aperture communicative with the mould cavity. A label transfer arm assembly removes a label from a supply magazine and places the label on one exposed label carrying segment while another label carrying segment is within the mould cavity undergoing the moulding and label attachment process.

U.S. Pat. No. 4,824,630 discloses a method for applying labels in the moulds of a plastic blow-moulding machine of the type wherein a plurality of sets of moulds are mounted on a wheel rotatable about a horizontal axis and the moulds are moved toward and away from one another to enclose a parison and the parison is then blown to the confines of the cavity between the mould sections, which comprises successively die punching labels from a web directly onto vacuum cups and delivering the labels successively between the mould sections.

Other in-mould labelling techniques are disclosed in, CN 201334143, JP 3-26524, JP 2-41224, US 2003/0099793, US 2004/0056389 and WO 93/04842.

In-mould labelled articles are used in a wide range of industries and due to an increasing social demand, it is becoming more common for the articles in question to be recycled, particularly those articles made of non-biodegradable materials. When such articles are returned by the consumer, they may be cleaned to remove any traces of their previous contents and commonly, the in-mould labels are removed from the articles so that either or both can be recycled.

Problems associated with methods known in the art for removing in-mould labels from articles include high operating costs which can render the recycling process uneconomically viable and the requirement of complex mechanical equipment.

WO 2006/054725 discloses an in-mould labelled article in which an in-mould label having a thermoplastic resin-containing substrate layer and a heat-seal layer that contains a heat-seal resin and a water-soluble binder is stuck to a shaped article and in which the in-mould label does not peel off from the shaped article even when the labelled in-mould shaped article is dipped in water at 40° C. for 4 days.

U.S. Pat. No. 7,807,243 discloses a label for in-mould forming having excellent suitability for de-labelling. The in-mould labelled container is de-labelled by applying a temperature of 90° C. in a thermostatic chamber.

EP 1 553 126 discloses a stretch resin film having a liquid absorption coefficient of at least 5 ml/(m$^2$·ms$^{1/2}$). The document also discloses a de-labellable label which is removed from an object when sprayed with water at a pressure of 2 MPa.

U.S. Pat. No. 6,165,576 discloses in-mould plastic labels which are provided with separation interfaces whereby the printed surfaces of the labels and the contaminating printing inks associated with them can be removed so as to allow recycling of the bottle stock without contamination by the printing inks.

U.S. Pat. No. 5,110,055 discloses apparatus and a method for its use in cleaning comminuted thermoplastic material for reuse in manufacture of moulded plastic products. Batches of plastic including adherent label materials and adhesives are agitated by a rotor until frictionally heated to a predetermined temperature. A flow of air is used to carry away loosened labels and adhesives. A small amount of water is introduced as a spray to dissolve adhesives and soften remaining label materials further, while loosened pieces continue to be removed in a stream of air. Thereafter, remaining adherent particles are removed in an aspirator providing a multi-stage cascade through counter-currents of air, and the particle-carrying air is then cleaned in a cyclone separator.

Other in-mould label removal techniques are disclosed in WO 2005/120963 and JP 7-92913.

BRIEF DESCRIPTION OF THE DRAWINGS

The present invention is more specifically described with reference to the following schematic figures:

FIG. 6: shows schematically a mould and a labelstock web which is fed through;

DETAILED DESCRIPTION

Figure 1:
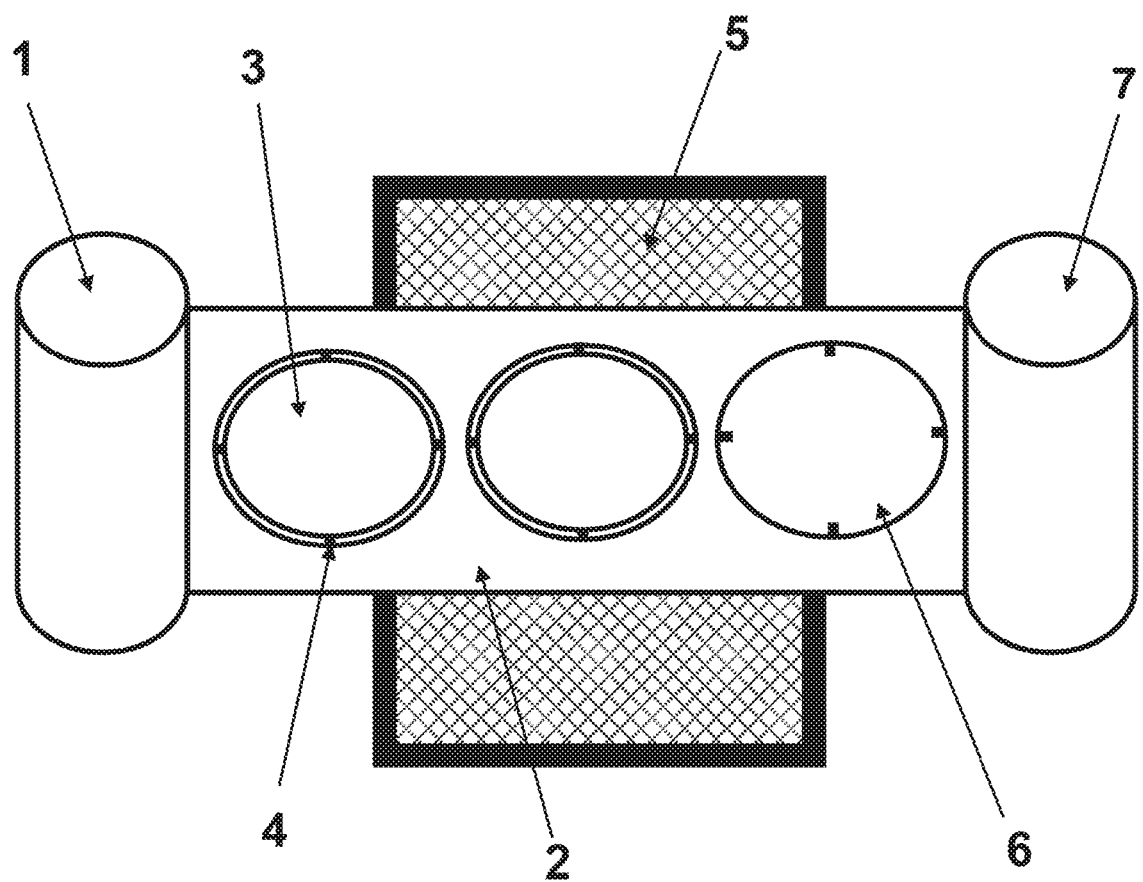
FIG. 1: shows a section of labelstock web in the stretch blow moulding area wound onto spools.

There is a need for an in-mould labelling process which does not suffer from the disadvantages of the prior art. Further to this, there is a need for an improved process suitable for removing an in-mould label from an article for recycling purposes. From the description that is to follow, it will become apparent how the present invention addresses the deficiencies associated with prior art processes, while presenting numerous additional advantages not hitherto contemplated or possible with prior art techniques.

According to a first aspect of the present invention, there is provided an in-mould labelling process for the manufacture of a labelled article comprising the steps of:
  feeding a labelstock web into a mould;
  forming an article in the mould such that the formed article contacts and effectively adheres to a label of the labelstock web;
  detaching the adhered label from the labelstock web; and
  removing the formed and labelled article from the mould.

In the context of this invention, by 'labelstock web' we mean any label carrier, preferably a web, for example a facestock web, from which labels may be removed. The web preferably has no removable backing or liner layer. This may have the advantage of reducing the amount of waste material associated with the process.

Advantageously, the label may be effectively adhered to the article whilst still being attached to the labelstock web. In this way the process of the invention effectively eliminates an entire step in a conventional in-mould labelling process—the previously necessary step of removing a label altogether from a labelstock web before positioning the removed label in a mould. Another possible advantage of the process of the invention is that the label may be held in the desired position until adhered to the article without the need for additional positioning means, such as vacuum suction. However, in some cases it may be desirable for some form of such additional conventional positioning means, such as vacuum suction or electrostatic attachment, to be employed to ensure correct positioning of the labelstock web in the mould so that final securement of the label is in the correct position with regard to the blown polymeric article—i.e. the final label on the labelled article is positioned correctly.

Preferably the step of detaching the adhered label from the labelstock web is effected by removing the formed and labelled article from the mould. For example the force of the article being removed from the mould may break the bonds between the label and the labelstock web thus removing the label from the web. A possible advantage to this may be that no additional equipment, cutting or otherwise, is required to remove the label from the labelstock web.

The label may cover the entire outer surface of the article. Alternatively, only a portion of the outer surface of the article may be covered. Label coverage may be dependent on the intended use of the article.

According to another aspect of the present invention, there is provided a process for manufacturing an in-mould labelled article, the process comprising the steps of:

placing a filmic label whilst still attached to a labelstock web into a mould for injection moulding, thermoforming, or blow moulding;

holding the labelstock web in position;

injecting a polymeric melt into, or thermoforming or blowing a polymeric preform in said mould so as to bind with the label; and removing the article from the mould, wherein the label is detached from the labelstock web during or after binding of the injected melt or the thermoformed or blown polymeric preform with the label.

The label surface may be printable. Suitable text or graphic can thus be illustrated on the article.

The label surface may be printed with a heat-resistant ink. The ink may, therefore, withstand the elevated temperatures during the moulding process.

The label surface may be printed prior to use in the in-mould labelling process, by methods known in the art.

The label may comprise a film.

The film may have a monoweb or laminate structure, whether by coextrusion, lamination, extrusion coating or further or alternative coating, or any combination thereof.

The film may be a polymeric film which optionally comprises a polyolefinic film, for example polyethylene, polypropylene, mixtures thereof, and/or other known polyolefins. The polymeric film can be made by any process known in the art, including, but not limited to, cast sheet, cast film and blown film. Biopolymeric films such as cellulosic or other carbohydrate or lactic acid based films (PLA for example) are also contemplated, as are other film forming materials such as polyesters, polyacetates and polyamides.

The film may be of monolayer or of multi-layer construction. This invention may be particularly applicable to films comprising cavitated or non-cavitated polypropylene films, with a polypropylene core and skin layers with a thickness substantially below that of the core layer and formed for example from co-polymers of ethylene and propylene or terpolymers of propylene, ethylene and butylene.

The film may comprise a biaxially orientated polypropylene (BOPP) film, which may be prepared as a balanced film using substantially equal machine direction and transverse direction stretch ratios, or can be unbalanced, where the film is significantly more orientated in one direction (MD or TD). Sequential stretching can be used, in which heated rollers effect stretching of the film in the machine direction and a stenter oven is thereafter used to effect stretching in the transverse direction. Alternatively, simultaneous stretching, for example, using the so-called bubble process, or simultaneous draw stenter stretching may be used.

Alternatively (or as well), the film may comprise a polyester film, a polyamide film, or an acetate film, for example.

The film may comprise any number of additional compatible functional or aesthetic materials such as anti-block additives, opacifiers, fillers, UV absorbers, cross-linkers, colourants, waxes and the like.

The film may be further treated, by corona discharge treatment for example, to improve ink receptivity of the film or of the skin layer of the film.

The label of the invention may be provided with other layers, such as primer layers, print layers, overlaquers, barrier layers and the like.

Barrier properties of the label film used in the in-mould labelling process of the invention may be further improved by the inclusion in or on the film of a transparent inorganic coating. Suitable inorganic materials include metal and metalloid oxides and nitrides such as silicon oxides (SiOx), aluminium oxides (AlOx), silicon nitrides ($Si_3N_4$) provided together with carbon, hydrogenated versions of silicon nitride, and mixtures of two or more thereof. Suitable techniques for depositing such coatings on the film include vapour deposition, physical vapour deposition (PVD), plasma enhanced chemical vapour deposition (PECVD), dielectric barrier discharge or magnetron or radio frequency generated plasma electron beam evaporation sources, induction heated evaporation sources, magnetron sputter deposition sources and atomic layer deposition (ALD).

The films used in accordance with the present invention can be of a variety of thicknesses according to the application requirements. For example they can be from about 10 μm to about 240 μm thick and preferably from about 15 μm to about 90 μm thick.

The label may comprise a film with a PvdC coating thereon. In this case, preferably, the label is oriented in the mould such that the PvdC coating on the film lies on or towards the exterior surface of the label when retrieved from the mould. More preferably, the film has a thickness of at least about 15 μm, preferably at least about 20 μm, more preferably at least about 30 μm and most preferably at least about 40 μm. Generally speaking, the thicker the substrate, the better its ability to insulate the PvdC coating against heat from the molten material entering the mould, but such considerations must be tempered by considerations such as cost, functionality and aesthetics.

The label may comprise an adhesive layer at least partially covering or entirely covering a surface of the label which contacts the article during the in-mould labelling process. The adhesive layer may be present in an amount of at least about 1 $gm^{-2}$, preferably at least about 2 $gm^{-2}$ or more preferably at least about 3 $gm^{-2}$.

The adhesive layer may be activatable.

The activatable adhesive layer may be activated by any activating means such as moisture, pressure, chemical or heat, for example. Preferably, the activatable adhesive layer is heat activated, for example the adhesive layer becomes tacky upon heating.

The heat activatable adhesive layer may comprise a polyolefin such as polypropylene (PP), polyethylene (PE) or polybutylene; a polystyrene; a polyamide; a polyvinyl acetate; a polycarbonate; a polyacrylate; a polyester; a polyurethane; a fluoropolymer; a starch such as polylactic acid (PLA); or co-polymers, terpolymers or combinations thereof. Preferably, the heat activatable adhesive layer comprises an ethylene-vinyl acetate (EVA) co-polymer. The heat activatable adhesive layer may comprise an EVA co-polymer in an amount of at least about 1 $gm^{-2}$, preferably at least about 2 $gm^{-2}$ or more preferably at least about 3 $gm^{-2}$.

The heat activatable adhesive layer of the label may be activated prior to the label being fed into the mould; preferably, whilst the label is in the mould; more preferably, during the moulding process; and most preferably, when the article contacts the label during the moulding process.

The article may be at such a temperature that when it contacts the label during the moulding process, it activates the heat activatable adhesive layer without substantially decomposing or damaging the remainder of the label. The temperature necessary for activating the adhesive layer may be in the range of from about 40° C. to about 100° C. for polyester bottle applications and preferably is in the range of from about 55° C. to about 65° C. The physical bond between the label and the article is preferably such that the label does not peel off or detach from the in-mould labelled article at temperatures of up to about 55° C., for example, during truck transport.

The label may effectively adhere to the article during the in-mould labelling process due to the heat or pressure, or preferably both the heat and pressure, of the article.

The moulding process of the present invention may be any known moulding process, for example thermoforming, vacuum forming, injection moulding, compression moulding, or blow moulding. Preferably, the moulding process is a blow moulding process. More preferably, the moulding process is stretch blow moulding. Most preferably, the moulding process includes stretch blow moulding a preform. This may be done in a 2-step process where the injection of the preform and the stretch blow moulding of the article are done in two separate machines.

The article may be formed from any mouldable material such as plastic, rubber or glass. Preferably the article is formed from a polymeric material for example: a polyolefin such as polypropylene (PP) or polyethylene (PE); a polyvinyl halide such as polyvinyl chloride (PVC); a polyester such a polyethylene terephthalate (PET), polyethylene naphthalate (PEN), polyethylene furanoate (PEF), Tritan®, or polylactic acid (PLA); a polystyrene; a polyamide; a polyvinyl acetate; a polycarbonate, or mixtures thereof. More preferably the article is formed from PET, which includes homopolymers and/or copolymers thereof. PET may be derived from crude oil or plants and optionally comprises colorants, as may any of the mouldable materials.

The labelstock web may be provided with at least one area of weakness for facilitating detachment of the label therefrom. One advantage of this may be that detaching the adhered label from the labelstock web is effected without the aid of cutting means such as a cutting tool or the mould itself. The area of weakness may comprise one or more perforations, thinned areas, scored sections or micro-tags.

After removal of the label, the remainder of the labelstock web (i.e. the section of the web from which the label has been removed—also referred to as the 'skeletal web') may be recovered from the mould by means of winding a spool, gravity, vacuum suction, electrostatic forces or another recovery means. Preferably, the remainder of the labelstock web is recovered from the mould once the in-mould labelled article is formed. More preferably, the remainder of the labelstock web is recovered from the mould once the formed in-mould labelled article has been removed from the mould. The remainder of the labelstock web may be provided in the form of a continuous residual web comprising at least one aperture corresponding to the site from which the label is detached during the in-mould labelling process.

A second label may be fed into the mould and a second article labelled according to the in-mould labelling process. Preferably, the second label is fed into the mould by winding the labelstock web forward.

The second label may be fed into the mould by winding the labelstock web forward once the previous label has detached from the labelstock web. Preferably, the second label may be fed into the mould by winding the labelstock web forward once the previous label has detached from the labelstock web and the formed and labelled article has been removed from the mould.

The labelstock web may be unwound on a first side of the mould and rewound on a second side of the mould, by using spools for example.

The in-mould labelling process may thus be run continuously.

Multiple labelstock webs may be fed into the mould so that two or more labels may be attached to the article simultaneously.

According to another aspect of the invention, during the in-mould labelling process the labelstock web may enter the mould through a first outer opening and leave it through a second outer opening. The first and/or second outer openings are preferably arranged in a mould half. More preferably, the said openings are positioned on opposite sides of the mould, mould half or mould portion.

In the context of the present invention the term 'mould half' does not necessarily mean half of a mould quantitatively. Rather, the term 'mould half' in this context means a part of the mould which, together with another mould half, is intended to form a mould and a mould cavity respectively. The mould may define a cavity.

The first and second outer openings may be connected via a tunnel that intersects the cavity of the mould. The tunnel may define the path of the labelstock web through the mould body. The cavity may divide the tunnel into two parts, a first part of the tunnel starting at the first outer opening and ending at a first inner opening on the cavity wall and a second part of the tunnel starting at a second inner opening on the cavity wall and ending at the second outer opening.

There may be one or more tunnels per mould and/or per mould half or mould portion. This may apply to one or both mould halves and/or one or more mould portions. The tunnels may be arranged one upon the other and/or on opposite sides of the mould. For example, there could be two parallel tunnels in one mould half and another tunnel in the other mould half to apply two labels on the front of the article and one label on the back of the article. Regarding the direction of movement of the labelstock web through the tunnels, the tunnels may or may not be (substantially) parallel to one another. They may for example be arranged at an angle of at least 0°, 5°, 10° or 30° and/or at an angle of at most 90°, 80° or 60° to one another and/or to the central axis of the mould cavity.

A single labelstock web may carry one or more different labels (having different sizes, shapes, print and/or colours etc.) which may be present within the same mould cavity at the same time, thus providing a highly flexible in-mould labelling process.

The area between the first and second inner openings may define a window in which a section of the labelstock web carrying a label is positioned prior to the article being formed, for example, prior to the blow moulding or injection moulding step. Preferably, the side of the label facing towards the cavity interior (i.e. towards the article) is coated with an adhesive layer, which bonds to the resin material of the article when it is still hot. Thus, the adhesive layer is preferably a heat activatable adhesive layer as previously described. Preferably, the remainder of the labelstock web, in particular the area surrounding and/or adjoining the label, does not bond to the article. For this reason, the remainder of the labelstock web may not be coated with an adhesive layer for bonding to the article. The remainder of the labelstock web may be uncoated or optionally coated with a material which does not bond to the article resin, so that it can be recovered from the mould after the article has been removed from the mould. If an adhesive layer is present on the remainder of the labelstock web, a non-bonding material may be applied on top of the adhesive layer.

The first and second inner openings may be connected via one or two grooves within and/or extending along the surface of the cavity. This allows for one or both of the margins of the labelstock web to cross the cavity within said grooves. In this way, only part of the width of the labelstock web may be presented to the article during its formation (i.e. during the moulding or inflating of the article). Thus, when the article expands it preferably does not contact the labelstock web across its entire width. A similar effect may be achieved by presenting the labelstock web to the article with one or both margins bent towards the mould. Additionally or alternatively, it may be advantageous in the context of the invention that the mould covers part of the labelstock web in the area of one or both margins of the labelstock web. Preferably, the mould covers the area of the labelstock web surrounding and/or adjoining the label so that during its formation, the article does not contact or attach to the surrounding and/or adjoining areas. According to yet another definition, on the side of the labelstock web that faces the article, the mould may provide an opening that preferably corresponds to the label in form and/or in size. However, it is conceivable that the opening may have the same form but be substantially larger in size than the label.

According to another aspect of the invention, the area of the cavity between the first and second inner opening (i.e. on the side of the labelstock web opposite of the article) may form a recess wherein the recess preferably corresponds to the label in form and preferably also in size. In this way the article, while expanding and after contacting the label, may expand further in the direction of the cavity wall. The resulting protrusion may then have the form of the label and may be covered by the label.

In cross-section (perpendicular to the movement direction of the labelstock web) the tunnel preferably has, in whole or in part, the form of a straight or a curved line. A curved line may have one, two or more points of inflection. In this context, a point of inflection means a point where the curved line changes its curvature from left to right or vice versa. Additionally or alternatively, the first and/or the second inner opening of the tunnel may have the form described above for the cross-section of the tunnel. Using a tunnel that is straight in cross-section is easiest to implement and useful in a wide range of applications. In particular, the labelstock web may move straight within a plane and may thus present a planar surface (and thus a planar label) to the article during its formation (i.e. during the moulding of the article). Other applications however may require that the label (and/or the part of the labelstock web carrying the label) which is present within the mould during the formation of the article and which is presented to the article during its formation to be bent, contorted, or even twisted. In particular, it may be bent or curved in one or two directions or dimensions. The direction may, for example, correspond to the movement direction of the labelstock web or may be perpendicular thereto.

It has been described that in cross-section (perpendicular to the movement direction of the labelstock web) the tunnel preferably has the form of a straight or a curved line, the line having two end points one at each end. If the orientation of a straight line through said end points is defined as the orientation of the cross-section of the tunnel, it can be said that the cross-section may preferably be oriented parallel to the longitudinal or central axis of the cavity or the article, or at an angle of at least 0°, 5°, 10°, or 30° and/or at most 90°, 70° or 60° thereto. If there is more than one tunnel this may apply to one or more of them. More specifically, in this context the angle between a first and a second line that do not cross is to be understood as the angle between the first line and the line defined by the orthographic projection of the second line upon the first line along or parallel to the shortest path between the first and second lines. Preferably, the cross-section of the tunnel serving as reference point in this context is the cross-section in the area at or between the two inner openings of the tunnel.

According to another aspect of the invention, a part of the cavity wall arranged in the area between the first and second inner opening (i.e. on the side of the labelstock web opposite of the article) may be replaceable and/or movable relative to the mould and/or removable from the mould. This allows for the variation of the surface of the cavity wall in the area behind the label. Such parts may have different surfaces facing the labelstock web.

There are several ways to control the area of the labelstock web that comes into contact with the article during its formation. Some have been described above. However, more generally speaking it is preferred that the sectional area defined by the intersection of the tunnel and the cavity corresponds to the label in form and preferably also in size.

The labelstock web may be fed through a path provided in the mould along a movement direction, which corresponds to the longitudinal direction of the labelstock web, into and out of the cavity. This has the advantage that labels of different sizes can be applied to different locations on the article. The path for transporting the labelstock web is preferably formed by a slit or tunnel provided in the mould body.

The path may correspond to a plane intersecting the mould such that opposite lateral edges of the path extend within the mould body, wherein the plane is preferably flat or curved in one or in two directions. This means that the inventive in-mould labelling process can be used in connection with any type of container shape.

The form and/or size of the label may correspond to the area defined by the intersection between the path and the cavity of the mould. Accordingly, only the label may be exposed to the article resin, the expanding hose or tube, during the in-mould labelling process so that it can easily be detached from the remainder of the labelstock web. A preferred feature of the process is that the label of the labelstock web may be positioned at a distance from the mould wall. This means that the label may adhere to the article before it has reached its final shape. Consequently, the label may also be expanded and deformed to a certain extent. The expanded or deformed label may have a surface area that is more than 1%, preferably more 3%, and most preferably more than 5% greater than the surface area of the original label, i.e. before expansion or deformation. It is understood that a label material may be selected which is sufficiently elastic in order to allow the required expansion. It may be provided that the print on the label is selected (e.g. in terms of its size, orientation, position and/or print weight) to account for the expansion and/or deformation of the label during the process. During the in-mould labelling process, the label may deform into embossing, debossings, concave or convex three-dimensional structures while pressed against corresponding mould portions and/or the mould wall.

Where the label is pre-printed, the label may comprise at least one face and the face opposite to the print on the label may be laminated with a reversible thermolacquer adapted to weld at temperatures above 50° C., preferably above 60° C. and most preferably above 65° C.

A gap of between 0.01 mm and 1.5 mm, preferably between 0.1 mm and 1 mm and most preferably between 0.3 mm and 0.8 mm, may be provided between the label and the labelstock web. The gap is preferably bridged by a plurality of spaced apart connecting elements, preferably in the form of micro-tags.

The labelstock web may be equipped with position marks which allow an exact positioning of the label within the mould window. The position marks may be in the form of optical markers or indentations at the lateral edges of the web. The labelstock web may be introduced into the cavity at any angle, i.e. parallel or orthogonal, relative to the longitudinal axis of the cavity or at any angle therebetween.

The labelstock web may be fed through a plurality of cavities arranged one after the other. The in-mould labelling process is especially useful in connection with linear blow moulding machines where a plurality of identical cavities are provided within a single mould—in contrast to rotary blow moulding machines where a number of blow moulding tools are located on a rotating wheel.

According to another aspect of the present invention, there may be provided a mould for manufacturing an in-mould labelled article comprising at least a first mould part and a second mould part, which first and second mould parts, when combined, define a mould cavity with an inner shape corresponding to the outer shape of an article to be formed in the mould. The mould may be further characterised in that in at least one of the first and second mould parts, a slit or tunnel is provided which intersects the mould cavity. This may allow a labelstock web comprising spaced-apart labels to be fed through the cavity or sections of the cavity.

The slit and/or tunnel may have a first outer opening leading to a first inner opening and a second inner opening leading to a second outer opening. The first and second inner openings may be connected via one or two grooves within and/or extending along a surface of the mould cavity. The area between the first and second inner openings may substantially correspond to the size of the label to be applied to the article in the in-mould labelling process.

The slit and/or tunnel may define a gap substantially corresponding to the width and thickness of a labelstock web fed through the slit and/or tunnel. Additionally or alternatively, the slit and/or tunnel may define a plane or curved path.

The mould may further comprise a recess for forming a protrusion or bulge on the article. The label may be applied to the protrusion or bulge during the in-mould labelling process. The slit and/or tunnel may intersect the recess in a plane substantially parallel to a bottom face of the recess.

The above described in-mould labels are greatly advantageous over traditional labels to be applied to an article after manufacturing thereof in that, on the one hand, the label is intimately bonded to the article and, therefore, highly resistant to ripping and, on the other hand, in terms of logistics because the articles to be labelled do not need to be stored and transported to the premises where traditional labels are to be applied. Among the many shortcomings of traditional labels are that they become easily scratched; there is not an integral bond between the label and the article which results in peeling; and, the part is not recyclable for the reason that the labels are not compatible with the underlying article. Typically, a standard adhesive or stick on label is produced with separate layers including a glue layer, a layer to cover the glue layer, a silicon layer, and an additional layer to transport all the other layers. This type of label structure usually prevents it from being recycled. However, the in-mould label structure and the labelstock web of the present invention are easy to recycle. In particular, where there is only a thin layer of adhesive and/or thermolacquer on the label, it may be possible to recycle the label as a single polymeric material. Additionally, there is added cost to the process of applying the label since it must be handled once for the moulding process and a second time to add the label.

In-mould labelling using labels of the present invention address these deficiencies in that the labels do not get scratched easily because they are more durable in adverse conditions (compared to traditional stick-on labels); peeling does not result due to the integral bond between the label and the moulded article; the label is not subject to fading under UV rays; the label is compatible with the material of the article and, therefore, recycling of the entire product is possible, in keeping with environmentally friendly practice.

According to another aspect of the present invention, there is provided an article labelled by the in-mould labelling process as previously described.

According to a further aspect of the present invention, there is provided a process for removing the label from the in-mould labelled article described above, comprising the steps of:

contacting the in-mould labelled article with a wash fluid;

heating the wash fluid to an intended or selected wash-off temperature; and removing the label from the in-mould labelled article.

Additionally, the process may include a step of comminuting the in-mould labelled article by any known means of chopping, flaking, grinding, mincing, shredding, crushing, pulverising or the like. Preferably, the in-mould labelled article is comminuted into less than about 3 $cm^2$ pieces, more preferably less than about 2 $cm^2$ pieces or most preferably less than about 1 $cm^2$ pieces. The in-mould labelled article may be comminuted prior to entering the wash fluid, whilst in contact with the wash fluid or once it has been removed from the wash fluid. The in-mould labelled article may be entirely comminuted or partially comminuted.

Once the label is removed from the in-mould labelled article, there exists the label and a de-labelled article, wherein the label and/or the de-labelled article may be whole, comminuted or partially comminuted.

The label and the de-labelled article may separate from one another via a separating means such as electrostatic force, vacuum suction, air flow, sieving, a conveyor, filtration or density separation. Preferably, the label and the de-labelled article separate by density separation, wherein one of either the label or the de-labelled article is less dense than the other. More preferably, the label is less dense than the de-labelled article. More preferably still, the label is less dense than both the de-labelled article and the wash fluid. Most preferably the label is less dense than both the de-labelled article and the wash fluid so that the label floats in the wash fluid and thus, separates from the de-labelled article by floatation separation.

The wash fluid may be water, an aqueous solution or a solvent. Preferably, the wash fluid is an aqueous solution such as caustic solution; more preferably, the caustic solution comprises, sodium hydroxide, potassium hydroxide or calcium hydroxide, for example. Most preferably, the caustic solution comprises sodium hydroxide.

The wash fluid may comprise sodium hydroxide in an amount of between about 0.1 weight percent and about 5 weight percent.

The wash fluid may be heated to at least about 30° C., preferably to at least about 40° C., more preferably to at least about 50° C., even more preferably to at least about 60° C., still more preferably to at least about 70° C. and most preferably to at least about 80° C.

The temperature of the wash fluid should not exceed the degradation temperature of the article and the label. Furthermore, temperatures greatly exceeding the boiling point of water are generally less preferable as the wash fluid of the present invention is preferably retained in the liquid phase. Thus, the preferred upper limits of the range of wash fluid temperatures are, for example, about 120° C., about 110° C., about 105° C., about 100° C. or about 95° C.

The label may expand upon exposure to the heated wash fluid. This may cause channels, capillaries or micro-tunnels to form between the label and the in-mould labelled article, which allow the wash fluid to pass between them and facilitate removal of the label by de-wetting the label/in-mould labelled article interface.

The wash fluid may be contained in a wash bath. The in-mould labelled article, comminuted or otherwise, may be placed sequentially in one or more wash baths, which may contain wash fluids of the same or different composition.

The in-mould labelled article may be agitated, for example: shaken, stirred, churned, mixed, vibrated or the like, by any known agitating means. Preferably, the in-mould labelled article is agitated whilst in contact with the heated wash fluid which may aid the removal of the label from the in-mould labelled article.

It will be appreciated that, according to the present invention, the adhesive layer and any other additional layers employed in the filmic label may be tightly bound to one another and to the polymeric core layer to prevent delamination during the process, as preferably, the entire label is removed from the in-mould labelled article during the process.

Once the label has been removed from the in-mould labelled article, the label or the de-labelled article or both, may be recovered from the wash fluid by any known recovery means such as vacuum suction, sieving, skimming off the top or directed air flow. Preferably, the label and the de-labelled article are recovered from the wash fluid separately so that an additional separating step may not be required.

The process may be run continuously.

Once the label has been removed from the in-mould labelled article, the label or the de-labelled article or both may be further processed. For example, the comminuted, de-labelled article may be melted down and extruded to form pellets, chips, flakes or the like, which may be used as a feedstock for producing a new article. Alternatively, if the de-labelled article remains in-tact then the article may be cleaned, relabelled and reused.

With reference to FIG. 1, there is schematically shown a labelstock web 2 comprising a printed label 3 attached to the labelstock web via multiple micro-tags 4. The printed labels are positioned such that they do not extend to the edges of the labelstock web, in other words, the labelstock web is a continual carrier. The labelstock web is fed into a stretch blow moulding area 5 using spools 1, 7, where an in-mould labelled article is formed. The printed label detaches from the labelstock web in the stretch blow moulding area leaving just the skeletal web 6. By winding spool 7 forwards, the skeletal web is removed from the stretch blow moulding area and a new label attached to the labelstock web is fed into the stretch blow moulding area from spool 1.

Figure 2:
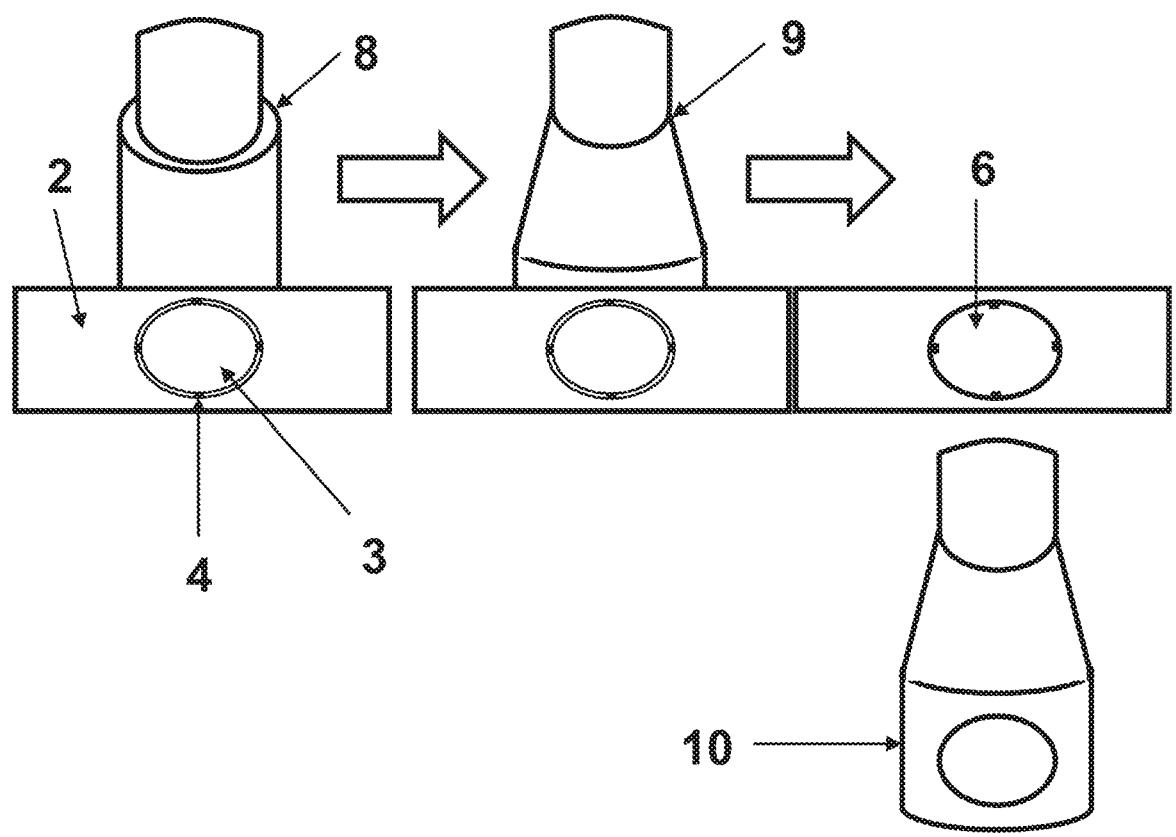
FIG. 2: shows a preform being stretch blow moulded, adhering to a label of the labelstock web and the label detaching from the labelstock web.

With reference to the schematic drawing in FIG. 2, there is shown a labelstock web 2 comprising a printed label 3 attached to the labelstock web via multiple micro-tags 4. The printed labels are positioned such that they do not extend to the edges of the labelstock web. A preform 8 is stretch blow moulded into a stretch blow moulded article 9. During stretch blow moulding, the label contacts the article and effectively adheres to it. The label detaches from the labelstock web as the in-mould labelled article 10 is removed from the mould, leaving just the skeletal web 6 in the mould.

Figure 3:
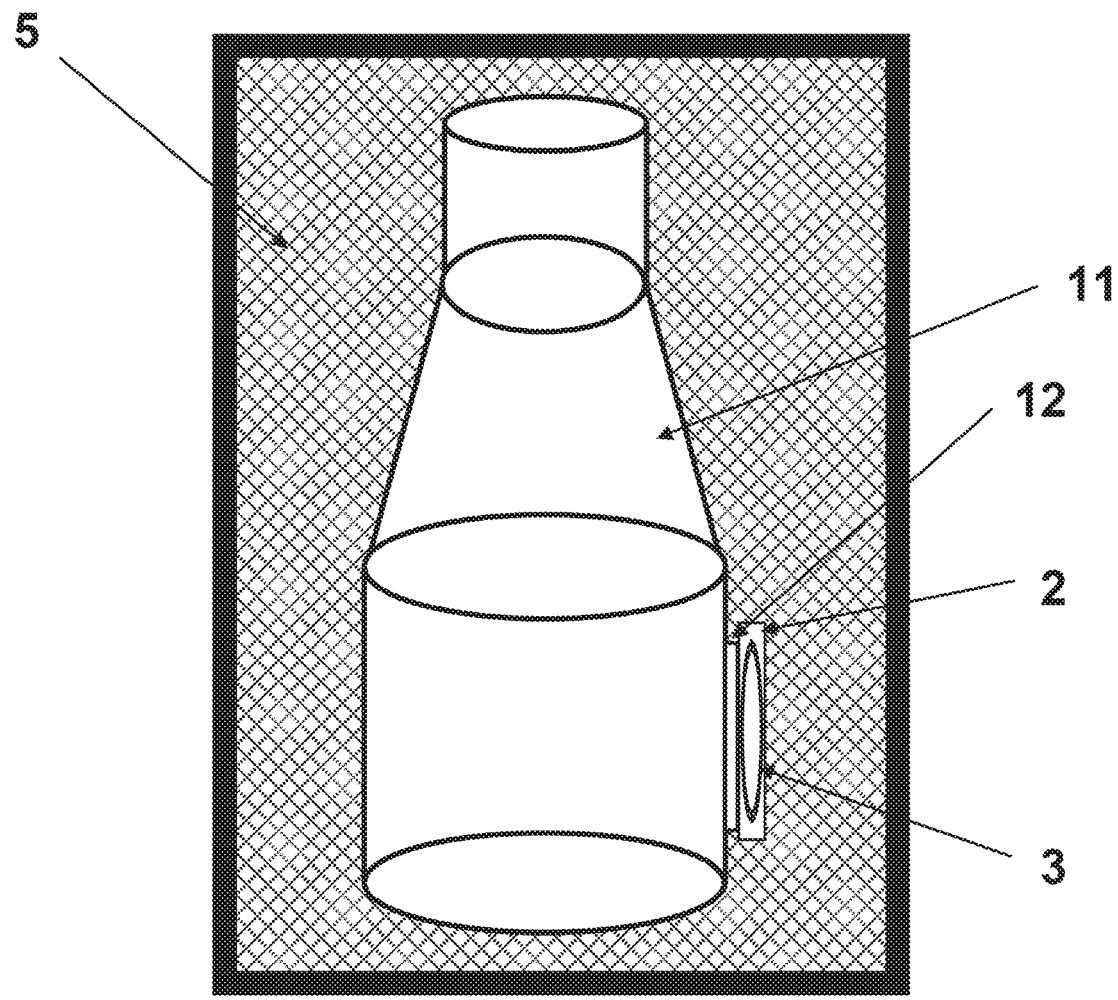
FIG. 3: shows the mould cavity wherein the article is blown and contacts a limited area of the labelstock web.

Referring now to the schematic drawing in FIG. 3, there is shown a mould cavity 11 in the desired shape for the article to be formed. The mould cavity is positioned within the stretch blow moulding area 5. The labelstock web 2 comprising the printed label 3 is fed into the stretch blow moulding area such that the adhesive layer of the label faces into the mould cavity. The mould is arranged such that the stretch blow moulded article only contacts the labelstock web in a limited area 12, namely, the label and not the remainder of the labelstock web.

Figure 4:
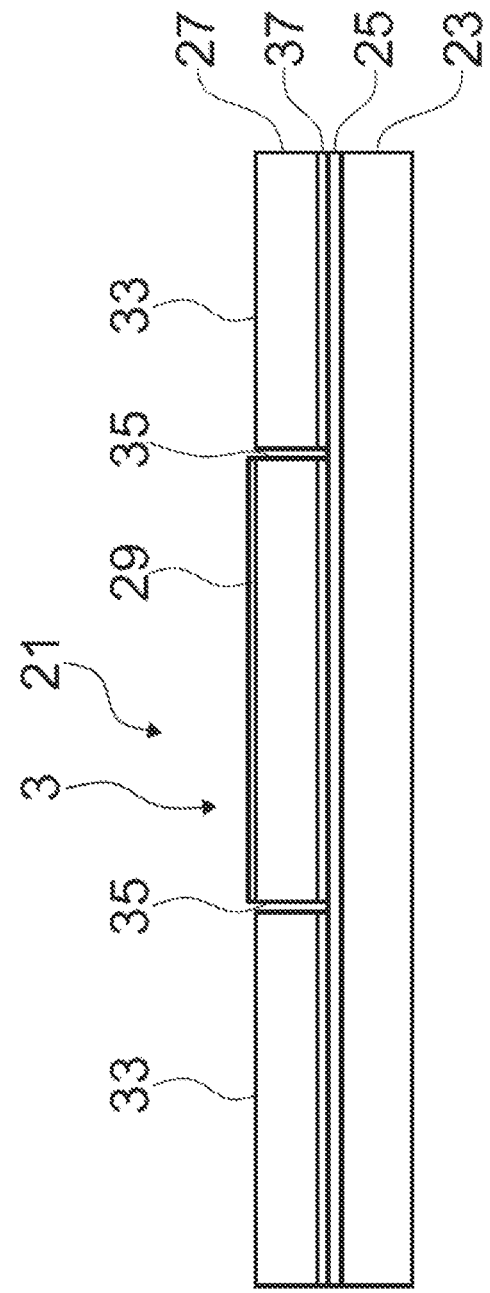
FIG. 4: shows a conventional labelstock web with a carrier liner and a label material having printed label areas and unprinted waste areas.

With reference to FIG. 4, there is shown a conventional labelstock web 21 comprising a carrier liner 23, usually paper, with a Silicone coating 25, on which a self-adhesive label material 27 is provided. The label material 27 is preferably, PE, PP, HDPE or OPP (oriented polypropylene) and comprises printed label areas 29 forming the label 3 and non-printed areas 33 surrounding the label. The printed and non-printed areas 29, 33 are separated from each other by a gap 35. The gap 35 is introduced by a cutting device which separates the printed and non-printed areas 29, 33 during manufacturing of the labelstock web so that the label can easily be detached from the liner 23. The label 3 has a printed front side and a backside. On the backside the label material 27 is coated with glue, providing a glue layer 37 for attaching the label to an article, for example a container.

Figure 5:
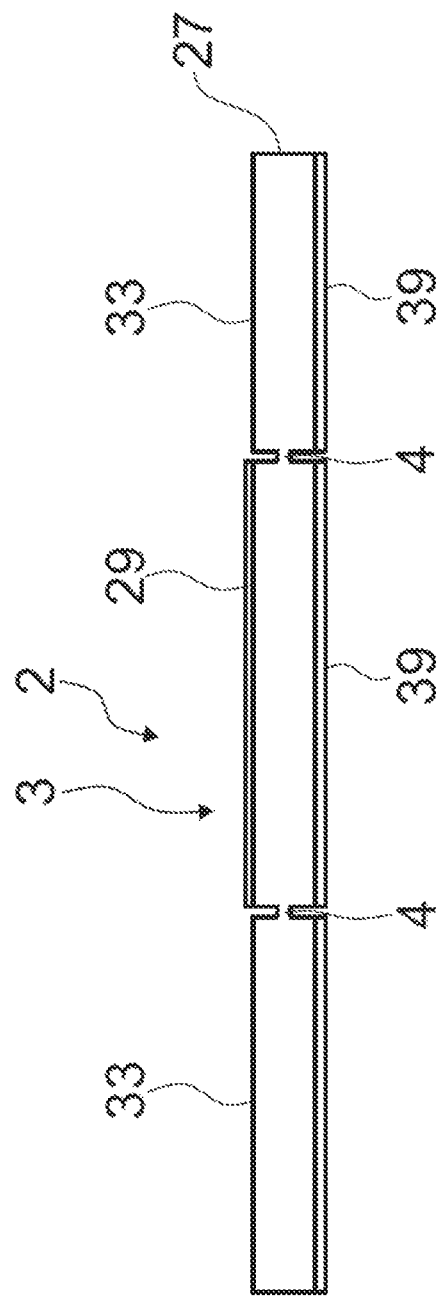
FIG. 5: shows a labelstock web according to the invention comprising only label material, whereas the labels are separated from the remaining label material by a perforated or otherwise weakened borderline.

As shown in FIG. 5, the labelstock web 2 according to an embodiment of the present invention does not require a carrier liner. The label material 27 comprises printed label areas 29 and non-printed areas 33 surrounding said label areas 29. Since no carrier liner is present, the label 3 (as defined by the printed label area 29) extends from the front side of the labelstock web 2 to the backside of the labelstock web 2 and/or the front side of the label 3 constitutes part of the front side of the labelstock web 2 while the backside of the label 3 constitutes part of the backside of the labelstock web 2. In contrast to the conventional labelstock web 21 (see FIG. 4), the printed and non-printed areas 29, 33 are held together by 1, 2 and preferably 3 or more micro-tags 4, bridge-like connections or a circumferential breaking line surrounding the label 3. When the label 3 is removed from the labelstock web 2, the skeletal web 6 remains. In contrast to the labelstock web 21 according to the prior art, the labelstock web 2 is coated with a heat activatable layer 39, in particular a thermolacquer. Preferably, the label material is the same material or selected from the same group of materials as used for the formation of the article, onto which the label is adhered. This may allow the recycling of the article without the need for detaching the label.

The wording "printed area" 29 as used in this context is understood to mean the area of the labelstock web 2 that forms and/or defines the label 3. It is preferably (but not necessarily) printed and/or coloured (e.g. with one, two or more colours) and/or has a special surface texture (for example with protrusions or recesses). Such a surface texture is preferably different from the surface texture of the article (e.g. a container) on which the label is to be applied. It may also be different from the surface texture of the so called non-printed area 33. In this way the label may later add features to the article like improved grip.

The wording "non-printed area" 33 as used in this context is understood to mean the area that surrounds the so called "printed area" 29. It is preferably (but not necessarily) plain, in particular not printed or not coloured, and preferably has a smooth surface texture.

The wording "printed area" and "non-printed area" has been chosen to better distinguish the two areas 29, 33 and to indicate their respective preferred design. When used, the said wordings shall however (in the case of "printed area") also disclose a label area in general and (in the case of "non-printed area") an area surrounding the said label area in general. For example, the printing process may require that the so called non-printed area is in fact printed, especially in those parts that are close to the label area. On the other hand, the so called printed-area may not be printed but could instead have a colour that is different from the one of the article the label is to be applied to. It could for instance be made of a coloured polymer. Alternatively, it could have a special surface texture as described above or some other visually or otherwise (e.g. by touching) perceivable characteristic.

Figure 6:
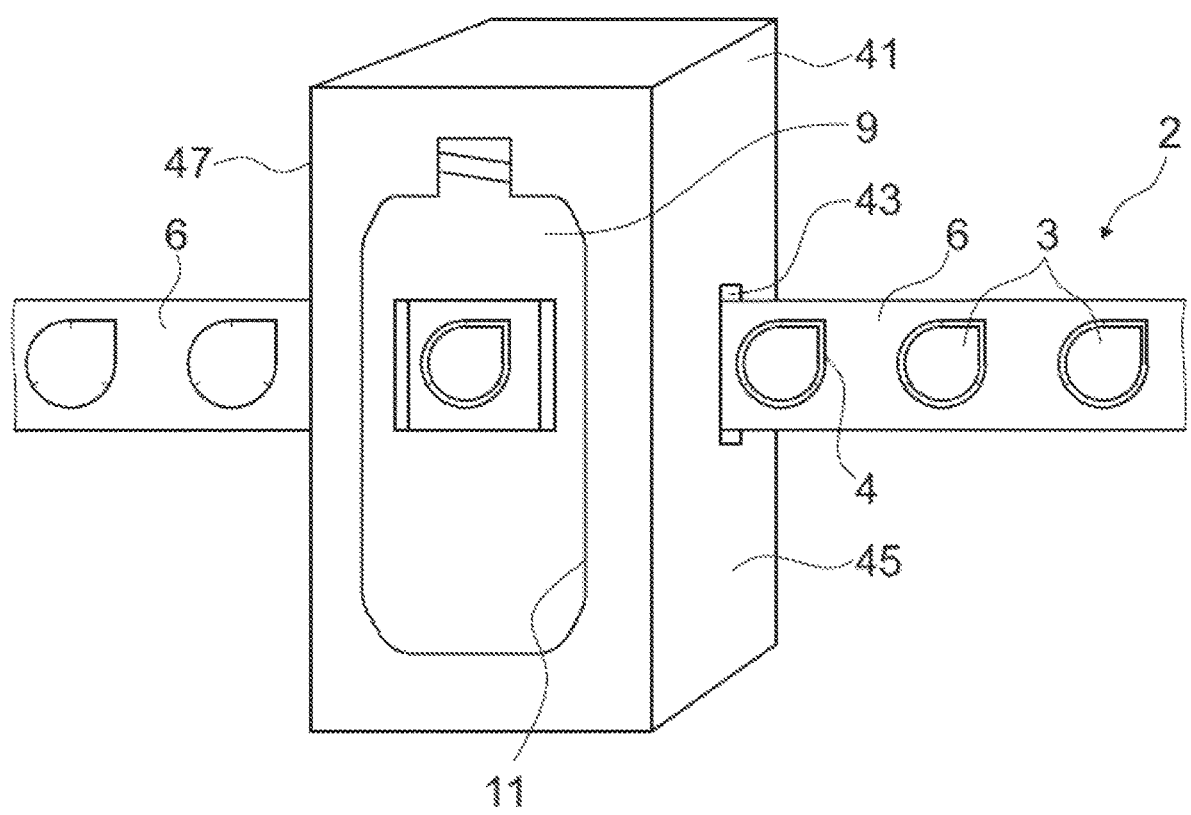

With reference to FIG. 6, there is shown a mould 41 with a cavity 11 through which a labelstock web 2 is fed. The labelstock web 2 enters the mould 41 interior through a slit 43 or tunnel provided at the lateral side 45 of the mould. After the removal of the label 3 the skeleton web 6 leaves the mould 41 through a second slit at the opposite side 47. A section of the labelstock web 2 with the label 3 is positioned inside the cavity 11 and is thereby exposed to the inflating hose or tube, which forms the article. In order to prevent adhesion of the skeletal web 6 to the article, the surface of the skeletal web 6 directed towards the cavity interior may be uncoated or coated with a layer of material which does not bond to the article, for example a silicone layer. The label itself is partially or entirely coated with an adhesive on the side oriented towards the article. In other words, the part of the labelstock web 2, which is to be transferred onto the article, is coated with an adhesive layer, preferably a heat activatable adhesive layer 39. Whereas the remainder of the web i.e. the skeletal web 6 is uncoated or coated with a layer which does not bond to the hot resin material of the article.

Figure 7:
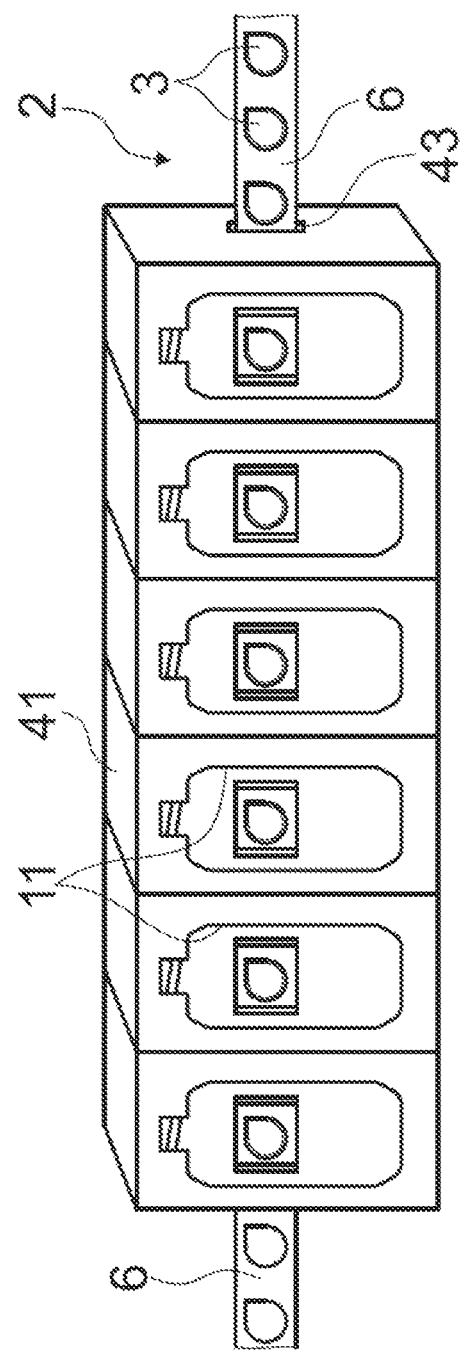
FIG. 7: shows a mould with multiple cavities arranged where the labelstock web is fed through all the cavities.

As can be seen from FIG. 7, the labelstock web 2 can be fed through a plurality of cavities 11 of a single mould 41. The distance between two adjacent labels 3 on the labelstock web 2 can be chosen to be the same, a fraction or a multiple of the distance between two adjacent cavities 11 within the mould 41.

Figure 8:
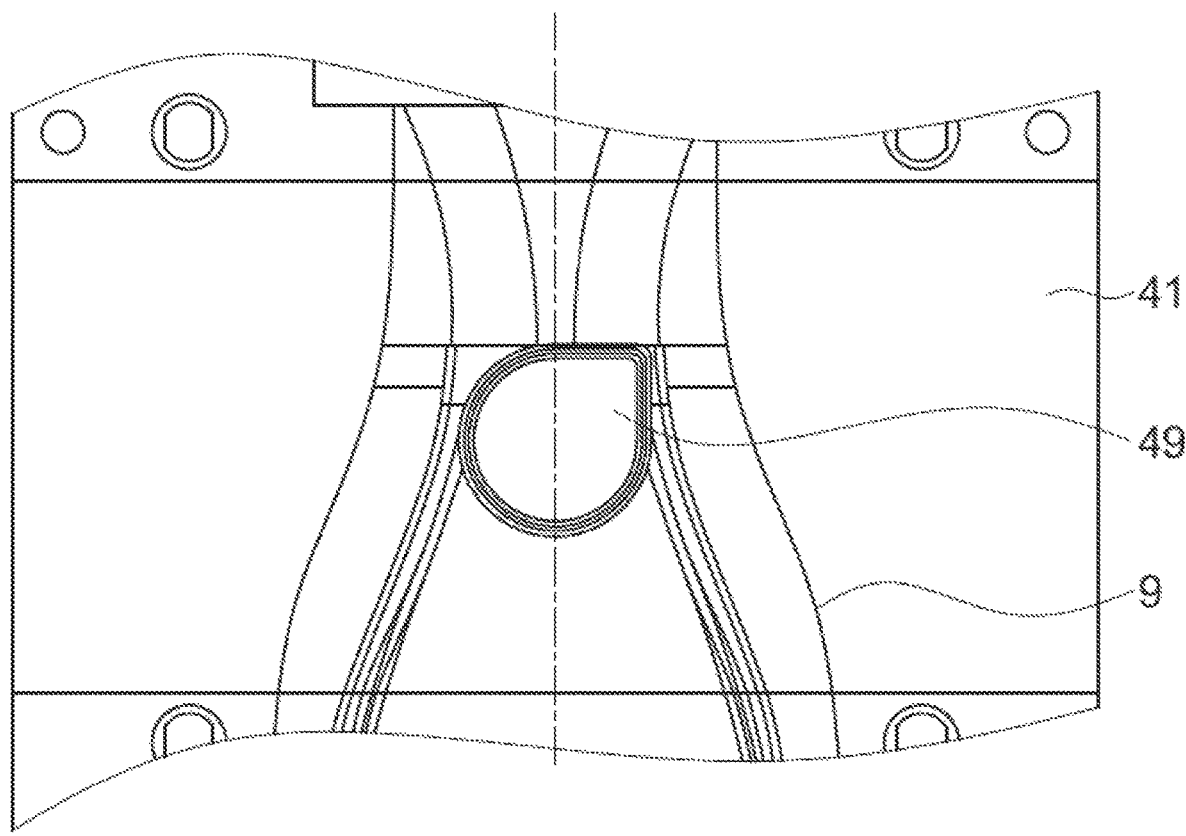
FIG. 8: shows a top view of the inside of a mould half with a cylindrical deepening.

With reference to FIG. 8, there is shown a top view of a section of a mould 41 with a recess 49 corresponding to and resulting in the formation of a bulge or projection on the article, e.g. a container. During the moulding process a label is positioned at said bulge or projection so that with the inflation of the article (e.g. container) the label is effectively adhered to the hot resin material.

Figure 9:
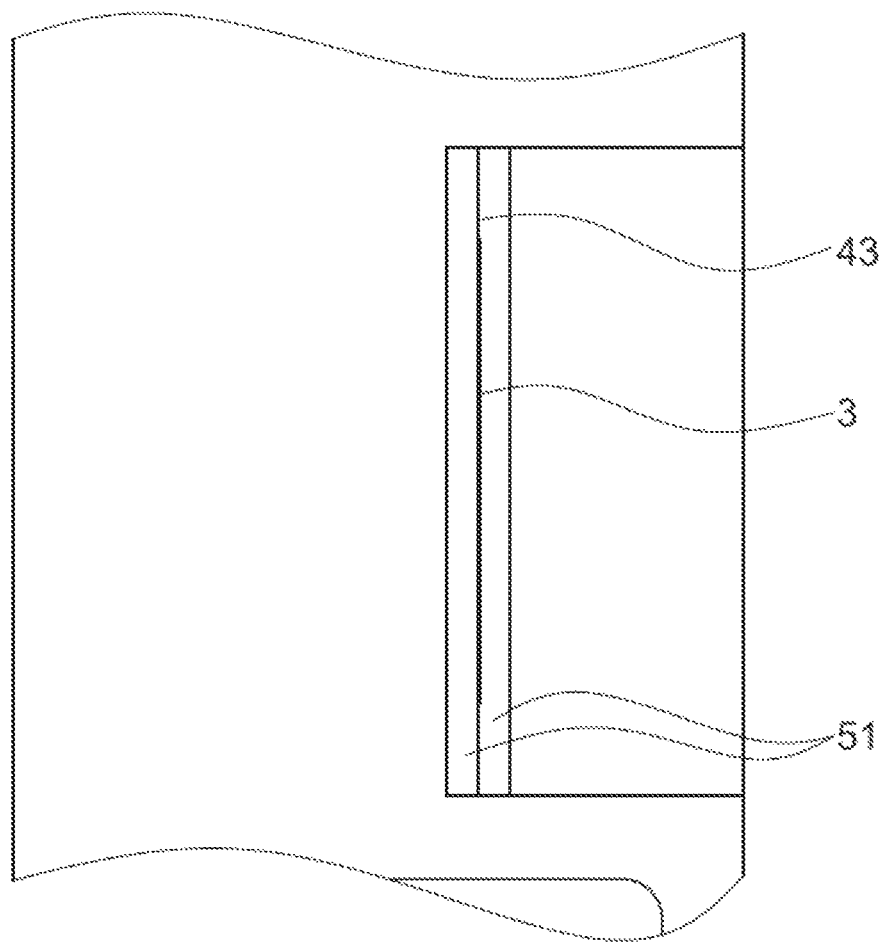
FIG. 9: shows a side view of the deepening of FIG. 8.

In FIG. 9 there is shown the slit 43 through which the labelstock web 2 is introduced into the cavity. On opposite sides of the slit 43 bezels 51 are provided which facilitates the feeding of the labelstock web 2 into the cavity.

Figure 10:
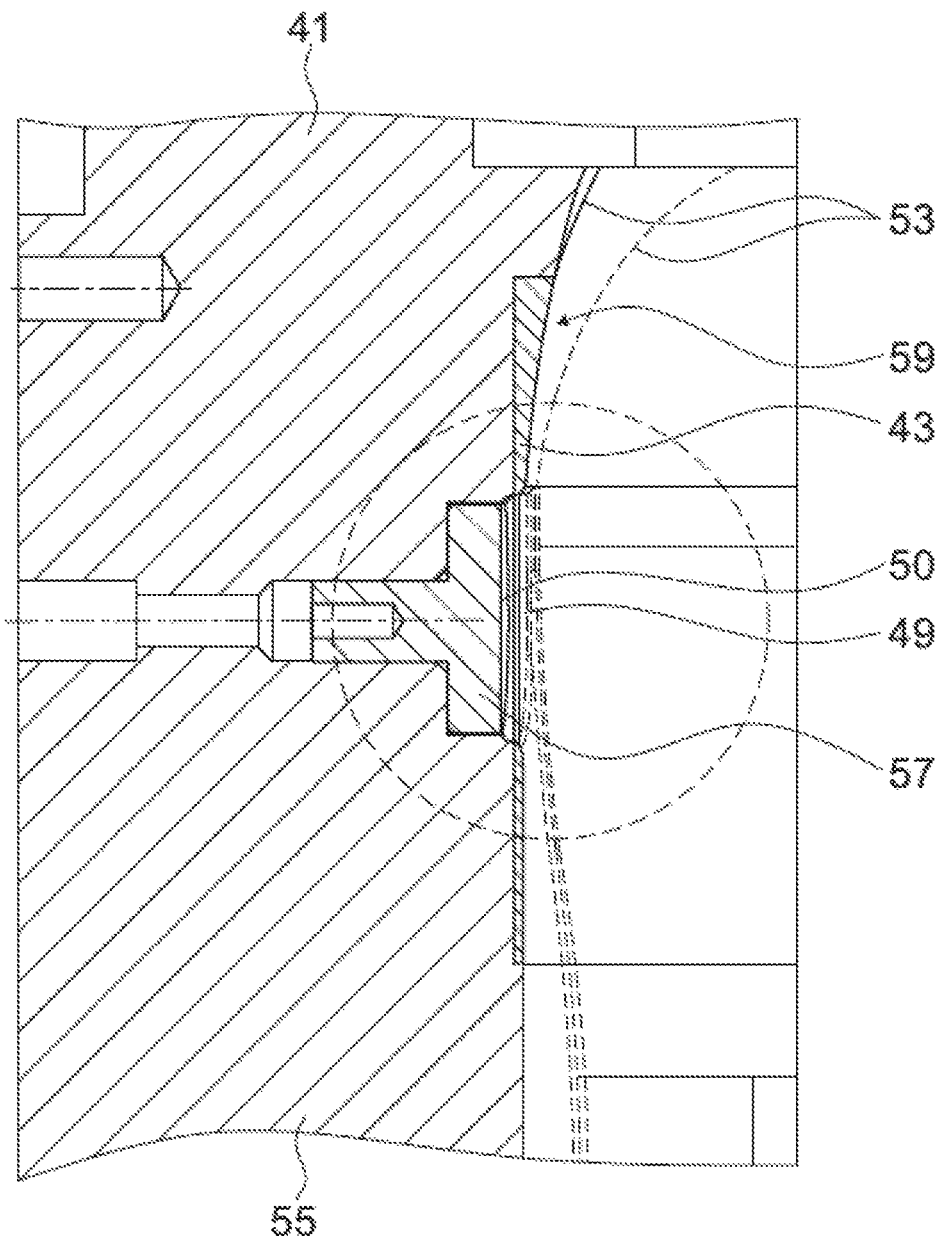
FIG. 10: shows a cross-section through the deepening of FIG. 8.
Figure 11:
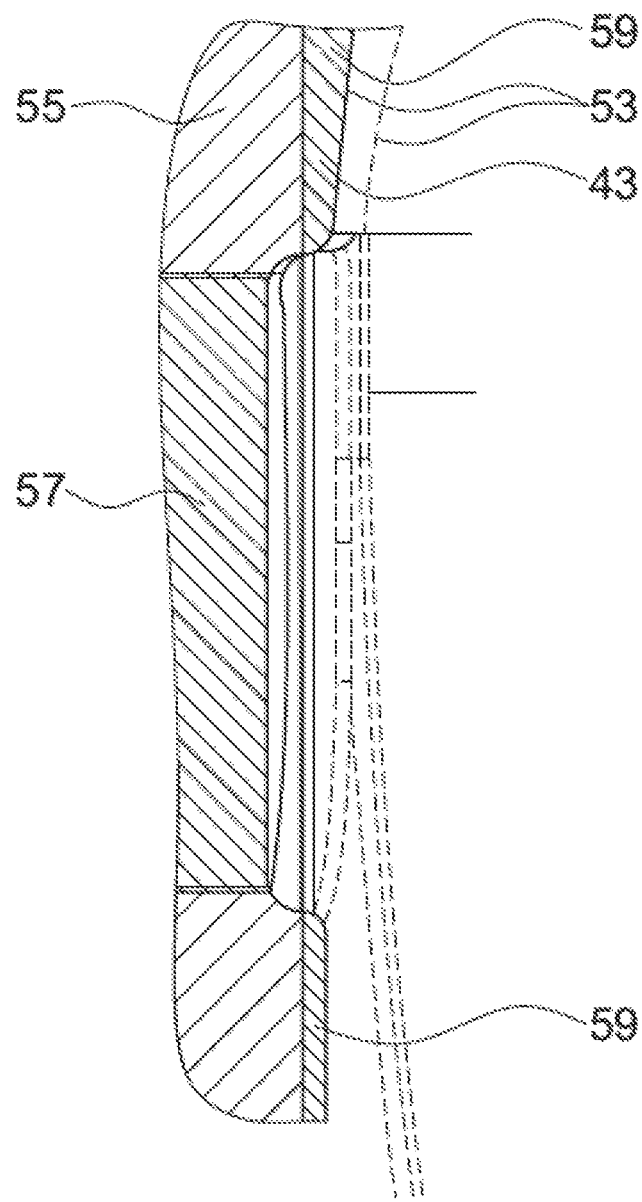
FIG. 11: shows the deepening of FIG. 8 in greater detail.

FIGS. 10 and 11 show an embodiment of a mould 41 with an inner contour 53 the slit 43 for the labelstock web 2 intersects the recess 49 approximately in the middle of its depth and extends beyond the recess 49 so that a margin of the labelstock web extends within the body 55 of the mould 41. Preferably, the slit 43 intersects the recess 49 in a plane substantially parallel to the bottom face 50 of the recess. As can be best seen from FIG. 11, the slit 43 has a substantially constant gap through its entire width. The ratio of the width of the slit 43 to the width of the recess 49 is preferably in the range between 6:1 and 1:6 and most preferably between 3:1 and 1:3.

In the embodiment shown in FIG. 10 there is provided a first insert 57 or die, the front side of which can have different shapes so that concave, flat or convex label areas can be formed in the moulding process. A second insert 59 forms in connection with the mould body a slit 43 through which the labelstock web can be introduced into and out of the cavity.

The present in-mould labelling process is particularly useful in connection with linear blow moulding machines where one or more rows of spaced apart cavities are provided in a single mould so that the labelstock web can be fed through a plurality of cavities.

Figure 12:
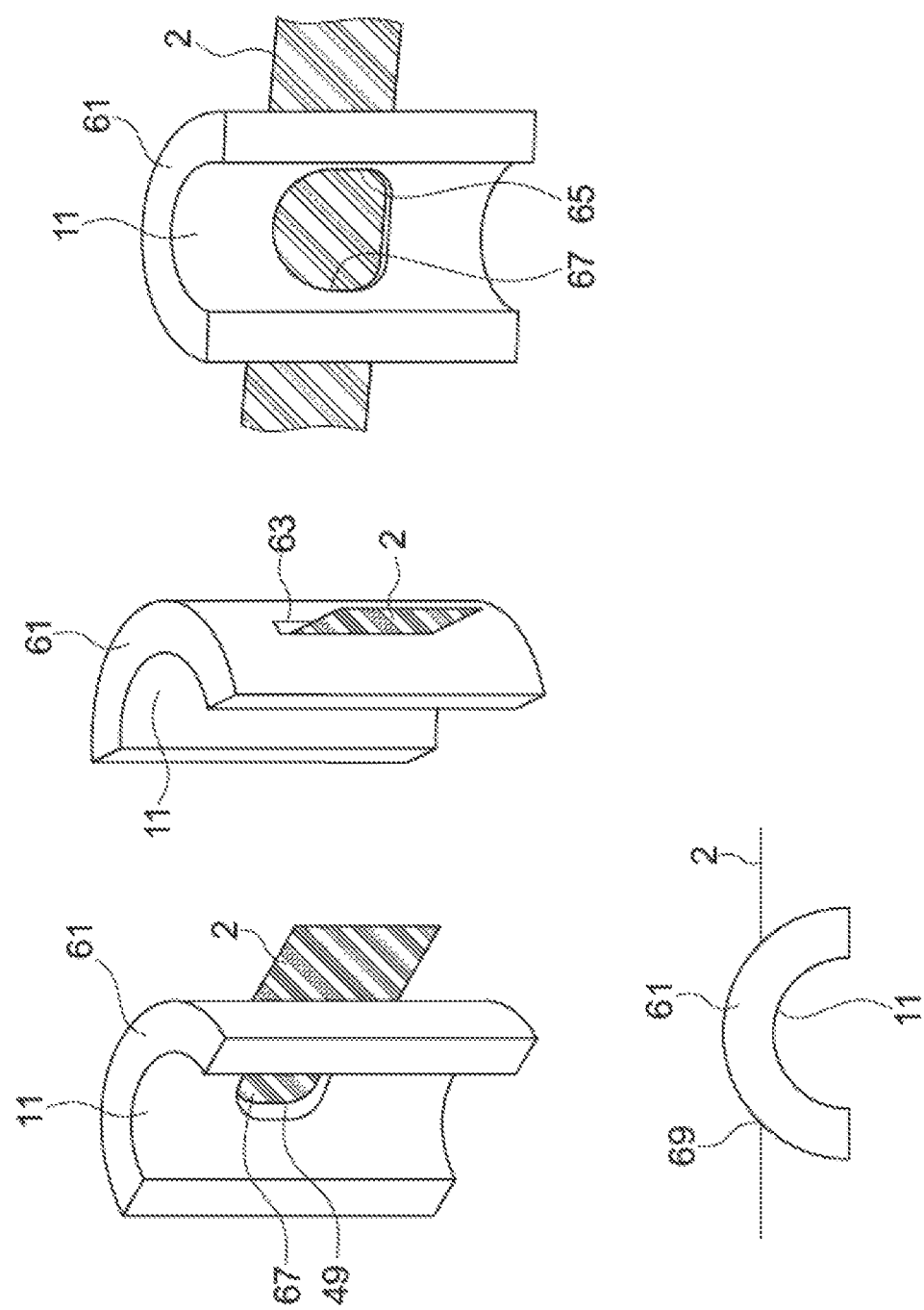
FIG. 12: schematically shows different views of a cylindrical mould half with a labelstock web path that extends within a plane.
Figure 13:
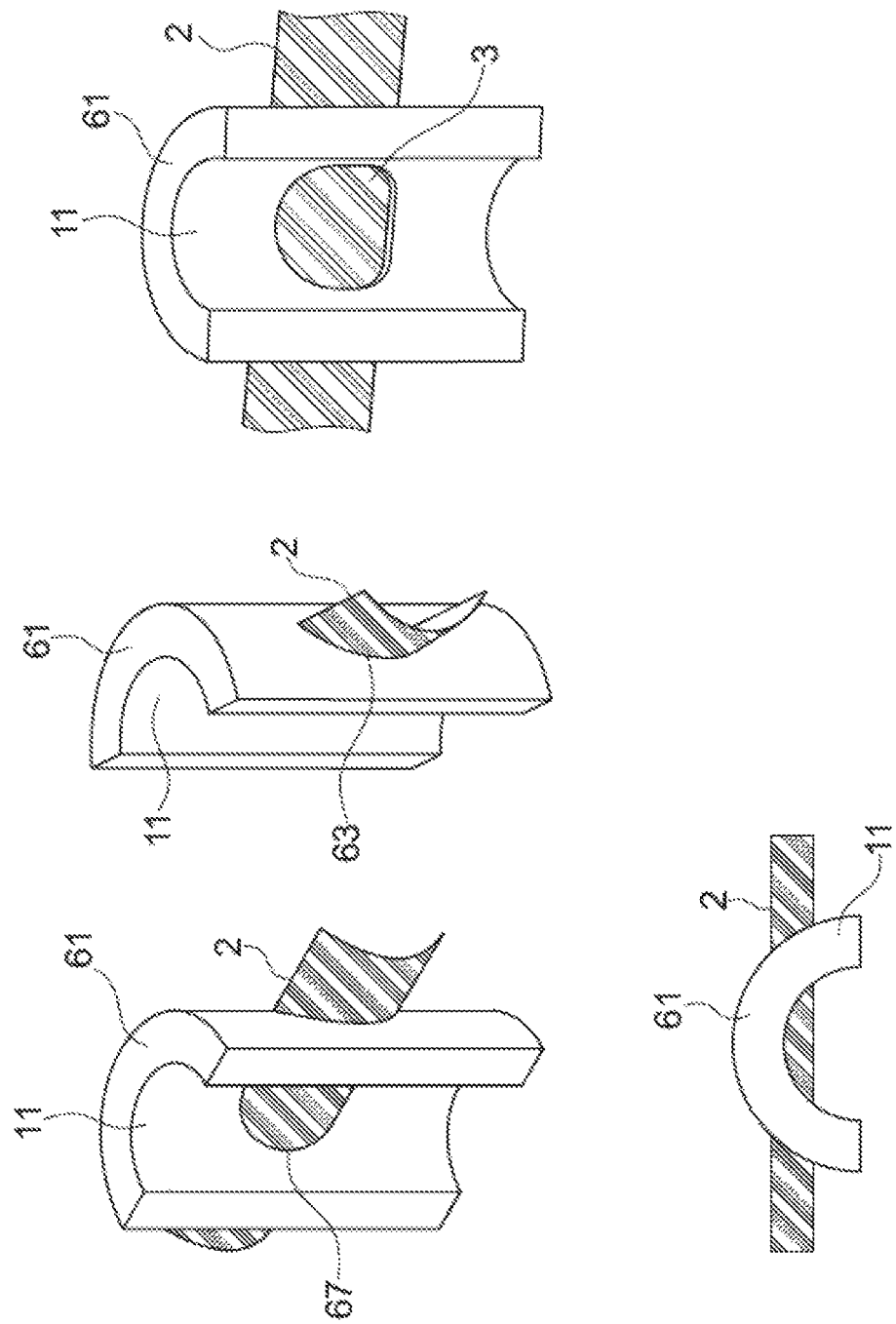
FIG. 13: schematically shows different views of a cylindrical mould half with a labelstock web path that is curved perpendicular to the feeding direction.

FIGS. 12 and 13 show, by way of illustration only, a labelstock web 2 that is transported through a cylindrical mould body along different shaped paths. The schematic representation of FIG. 12 corresponds to the embodiment shown in FIGS. 8 to 11 where in one mould half 61 there is provided the recess 49. The labelstock web path leads through the sidewalls of said recess 49 whereby the path may be provided at a distance from the bottom face of the recess. The labelstock web 2 is fed into the mould cavity through a first outer opening 63 leading to a first inner opening 65 into the cavity 11, and leaves the cavity through a second inner opening 67, which leads to a second outer opening 69.

In FIG. 13 the labelstock web path is straight along its movement direction and curved perpendicular thereto. As in the other embodiments the window of the labelstock web path (corresponding to the intersection of the labelstock web path with the inner mould surface) substantially corresponds to the size of the label.

Figure 14:
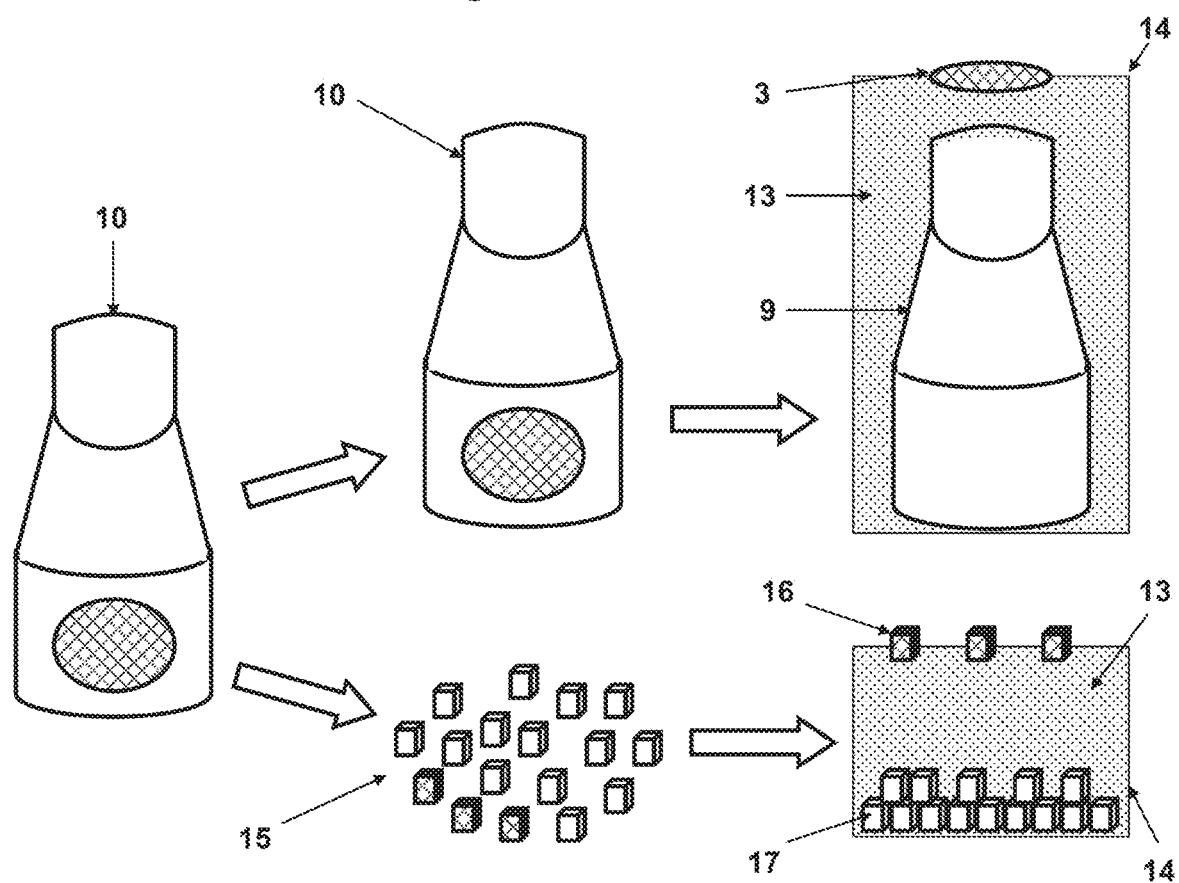
FIG. 14: shows two alternative ways in which a label can be removed from an in-mould labelled article using a wash-off process.

Next, with reference to the schematic drawing in FIG. 14, there is shown the in-mould labelled article 10. In the top pathway, the in-mould labelled article, as a whole, is placed into a wash fluid 13 contained in a wash bath 14. The label 3 is removed from the in-mould labelled article, leaving the de-labelled article 9. The label and the de-labelled article separate from one another by floatation separation as the label is less dense than both the de-labelled article and the wash fluid.

In the bottom pathway of FIG. 14, the in-mould labelled article 10 is completely comminuted into pieces 15 prior to entering the wash fluid 13 contained in the wash bath 14. Once in the wash fluid, the comminuted pieces of the label 16 separate from the comminuted pieces of the article 17 by floatation separation. Again, this is due to the comminuted pieces of label being less dense than both the comminuted pieces of the article and the wash fluid, such that the comminuted pieces of label float to the top of the wash fluid.

The invention is further illustrated by the following examples, which are by way of illustration only, and are not limiting to the scope of the invention described herein.

Example 1—In-Mould Labelling Process

A three layer polymeric tube was formed by co-extruding a core layer (comprising polypropylene homopolymer, 12% of 70% $TiO_2$, and 3% antistatic masterbatch containing a blend of glycerol mono-stearate and ethoxylated amine) with a layer of polyethylene/polypropylene/polybutylene terpolymer (a random copolymer comprising polypropylene/ethylene/butylene-1) as an outer skin layer (first sealing layer) on one side of the core layer, and on the other side of the core layer there is a laminating layer (a polypropylene-polyethylene/-polybutylene random terpolymer). The tube was cooled and subsequently reheated before being blown to produce a three layer biaxially oriented film tube. The film tube was then nipped and laminated to itself (laminating layer to laminating layer constituting one internal layer), spliced to form a laminated film with five layers to provide a 58 μm thickness laminate film. The laminate film was also provided with a further layer of primer.

The laminate film was then coated with an adhesive layer comprising aqueous dispersed EVA resin using reverse gravure laydown, before being dried.

It will be understood that similarly constituted clear films may be prepared as above, but with the omission of $TiO_2$. In addition, it will be understood that similarly constituted density/cavitated films may be prepared using standard techniques (such as cavitation around a particle).

The laminate film was cut into the form of a labelstock, printed and micro-tagged labels were die cut from the stock. The resulting labelstock web was then mounted on a spool and fed through a mould to be collected on a second spool. As each die cut label was positioned in the mould, a polymeric bottle preform of PET was stretch blown in the mould to make contact with the label as described above. The labelled blown bottle was then removed from the mould with the label adhered thereto, leaving the labelstock remainder (skeletal web) behind/in the mould. The second spool was then wound forward to bring a new die cut label into the mould and the process was repeated.

Example 2—Wash-Off Process

Articles labelled with different label types were tested to see how long it took for the label to be removed from the article in a wash-off process according to the present invention.

i) PET article labelled with WPA or CPA labels at a wash-off temperature of 80° C.

A labelled article replicating a label attachment corresponding to that formed from the in-mould labelling process of Example 1 was formed by heat sealing a label to a PET substrate at either 70° C. or 90° C., and 40 psi for 2 seconds. The label comprised a standard polypropylene label film which was either white or clear, coated with an EVA adhesive layer. The label films used are produced by Innovia Films Limited under the designations WPA (white film) and CPA (clear film).

The labelled article was placed in a wash bath containing a 2% sodium hydroxide aqueous solution at a temperature of 80° C. and agitated by a stirrer. The time taken for the label to be completely removed from the article was recorded and the results are shown in Table 1 below.

TABLE 1

| Coated Film Type | Approx. Coat Weight ($gm^{-2}$) | Heat Seal Strength to PET at 40 psi for 2 sec (g/25 mm) Sealed at 70° C. | Heat Seal Strength to PET at 40 psi for 2 sec (g/25 mm) Sealed at 90° C. | Wash-Off Time (mins) Sealed at 70° C. | Wash-Off Time (mins) Sealed at 90° C. |
|---|---|---|---|---|---|
| CPA | 0.94 | 36 | 48 | — | 2.2 |
| CPA | 2.04 | 215 | 344 | 0.3 | 7.0 |
| CPA | 7.13 | 681 | 670 | — | 9.1 |
| WPA | 2.04 | 311 | 439 | 3.9 | 5.9 |

From the results it can be seen that in each experiment the label was removed from the article within 10 minutes of being in the wash fluid.

ii) PET article labelled with WPA or CPA labels at wash-off temperatures of 60° C., 70° C. or 80° C.

A labelled article replicating a label attachment corresponding to that formed from the in-mould labelling process of Example 1 was formed by heat sealing a label to a PET substrate at 90° C., and 40 psi for 2 seconds. The label comprised either a WPA or CPA label film (as described above), coated with an EVA adhesive layer.

The labelled article was placed in a wash bath containing a 2% sodium hydroxide aqueous solution at a temperature of 60° C., 70° C. or 80° C., with agitation from a stirrer. The time taken for the label to be completely removed from the article was recorded and the results are shown in Table 2 below.

TABLE 2

| Wash-Off Temperature (° C.) | Wash-Off Time (mins) WPA | Wash-Off Time (mins) CPA |
|---|---|---|
| 60 | 31.7 | >45.0 |
| 70 | 27.9 | 17.8 |
| 80 | 5.9 | 8.8 | iii) PET article labelled with PP, HDPE, PET, PLA or cellulose-based labels

A labelled article replicating a label attachment corresponding to that formed from the in-mould labelling process of Example 1 was formed by heat sealing a label to a PET substrate at 90° C., and 40 psi for 2 seconds. The label comprised a PP, HDPE, PET, PLA or cellulose-based film substrate, coated with approximately 2 $gm^{-2}$ EVA adhesive.

The labelled article was comminuted into roughly 1 $cm^{-2}$ pieces and placed in a wash bath containing a 2% sodium hydroxide aqueous solution at a temperature of 80° C., with agitation from a stirrer. Each test was repeated twice and the time taken for the label to be completely removed from the article was recorded. The results are shown in Table 3 below.

TABLE 3

| Label Substrate Type | Test 1 (mins) | Test 2 (mins) |
|---|---|---|
| PP | 3.15 | 3.25 |
| HDPE | 0.47 | 0.50 |
| PET | 2.18 | 2.20 |
| PLA | 3.42 | 4.00 |
| Cellulose | 8.10 | 9.58 |

Again, it can be seen from the results that the wash-off process removes the labels efficiently—in all experiments the time taken for removal was under 10 minutes.

What is claimed is:

1. A mould for manufacturing an in-mould labelled article comprising at least a first mould part and a second mould part, which first and second mould parts, when combined, define a mould cavity with an inner shape corresponding to the outer shape of the article to be formed in the mould, wherein in at least one of the mould parts a slit or tunnel is provided which intersects the mould cavity, wherein the slit or tunnel defines a curved path.

2. The mould according to claim 1, wherein the slit or tunnel has a first outer opening leading to a first inner opening and a second inner opening leading to a second outer opening.

3. The mould according to claim 2, wherein the first and second inner openings are connected via one or two grooves within and/or extending along a surface of the mould cavity.

4. The mould according to claim 2, wherein an area between the first and second inner openings substantially corresponds to the size of a label to be applied to an article in an in-mould labelling process.

5. The mould according to claim 1, wherein the slit or tunnel defines a gap substantially corresponding to the width and thickness of a labelstock web fed through the slit or tunnel.

6. The mould according to claim 1, wherein the mould comprises a recess for forming a protrusion or bulge on the article, on which the label is applied during the in-mould labelling process.

7. The mould according to claim 6, wherein the slit or tunnel intersects the recess in a plane substantially parallel to a bottom face of the recess.

* * * * *